(12) United States Patent
Teng et al.

(10) Patent No.: US 8,616,088 B2
(45) Date of Patent: Dec. 31, 2013

(54) JOINT DEVICE AND CONTROL METHOD THEREOF

(75) Inventors: Ming-Chang Teng, Hsinchu (TW); Yi-Jeng Tsai, Taichung (TW); Chin-Chi Hsiao, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 278 days.

(21) Appl. No.: 13/071,094

(22) Filed: Mar. 24, 2011

(65) Prior Publication Data

US 2012/0079904 A1    Apr. 5, 2012

(30) Foreign Application Priority Data

Oct. 1, 2010 (TW) ................................ 99133578 A

(51) Int. Cl.
*F16H 37/06* (2006.01)
(52) U.S. Cl.
USPC .................... 74/665 C; 74/490.05; 74/665 M
(58) Field of Classification Search
USPC ........ 74/490.05, 665 A, 665 C, 665 L, 665 M
See application file for complete search history.

(56) References Cited

U.S. PATENT DOCUMENTS

| | | | | |
|---|---|---|---|---|
| 4,662,814 A | * | 5/1987 | Suzuki et al. | ................. 414/730 |
| 5,019,755 A | | 5/1991 | Walker | |
| 5,692,412 A | * | 12/1997 | Rosheim | ................... 74/490.05 |
| 5,979,264 A | * | 11/1999 | Rosheim | ................... 74/490.06 |
| 6,658,962 B1 | | 12/2003 | Rosheim | |
| 6,698,313 B2 | | 3/2004 | Gaffney et al. | |
| 6,871,563 B2 | | 3/2005 | Choset et al. | |
| 7,454,995 B2 | * | 11/2008 | Koyama et al. | ............ 74/490.05 |
| 7,734,375 B2 | * | 6/2010 | Buehler et al. | ................ 700/245 |

FOREIGN PATENT DOCUMENTS

| | | |
|---|---|---|
| CN | 101192783 A | 6/2008 |
| EP | 1616672 A1 | 1/2006 |
| KR | 20080048862 A | 6/2008 |
| TW | 210639 | 8/1993 |
| TW | M364056 | 9/2009 |
| TW | 201020079 | 6/2010 |

OTHER PUBLICATIONS

Wolf et al., A New Variable Stiffness Design: Matching Requirements of the Next Robot Generation, 2008 IEEE International Conference on Robotics and Automation, pp. 1741-1746, Pasadena, CA, USA, May 19-23, 2008.

(Continued)

*Primary Examiner* — Ha D Ho
(74) *Attorney, Agent, or Firm* — Morris Manning & Martin LLP; Tim Tingkang Xia, Esq.

(57) ABSTRACT

A joint device includes a rotary shaft, two fixing members, two driving members, two transmission gears, and a link gear. The two driving members are respectively fixed to the two fixing members, and the two fixing members are pivoted to each other through the rotary shaft. The two driving members are respectively connected to and drive the two transmission gears. The link gear is pivoted to the rotary shaft and engaged with the two transmission gears respectively, so that the two driving members are in a transmission relation. The joint device adopts the combination of dual driving members and gear sets, thereby achieving the high reactivity and high load function.

9 Claims, 14 Drawing Sheets

(56) References Cited

OTHER PUBLICATIONS

Kim et al., A Serial-Type Dual Actuator Unit With Planetary Gear Train: Basic Design and Applications, pp. 108-116, IEEE/ASME Transactions on Mechatronics vol. 15, No. 1, Feb. 2010.

Park, Shinsuk, Safety Strategies for Human-Robot Interaction in Surgical Environment, pp. 1769-1773, SICE-ICASE International Joint Conference 2006, Oct. 18-21, 2006 in Bexco, Busan, Korea.

Intellectual Property Office, Ministry of Economic Affairs, R.O.C., "Office Action", Dec. 24, 2012, Taiwan.

* cited by examiner

JOINT DEVICE AND CONTROL METHOD THEREOF

CROSS-REFERENCE TO RELATED APPLICATIONS

This non-provisional application claims priority under 35 U.S.C. §119(a) on Patent Application No. 099133578 filed in Taiwan, R.O.C. on Oct. 1, 2010, the entire contents of which are hereby incorporated by reference.

FIELD OF THE INVENTION

The present disclosure relates to a joint device and a control method thereof, and more particularly to a joint device with dual driving members and a control method thereof.

BACKGROUND OF THE INVENTION

With the coming of senior and low fertility society, the labor population is greatly reduced, which further negatively affects the progress of the entire nation and society. To address this problem, robots gradually enter human daily life from the plants to assist human in dealing with hazardous work or trifles. As the robots frequently come into human life, it is quite important to develop a high reactivity, high load and safety manipulator. In the manipulator, mainly a mechanical joint is used to link two arms, so that the two arms pivot relative to each other to achieve the effect of moving the manipulator.

Generally speaking, to achieve the high reactivity and high load mechanical joint at the same time, a high strength structure and a high power motor must be used. Accordingly, the high reactivity and high load mechanical joint has a relatively large inertia when moving, so when the safety mechanism is actuated, a more powerful energy absorption device is required to stop the mechanical joint running at high speed. At present, the industrial manipulator may achieve the above objectives, but is heavy and has a high cost, so the manipulator cannot be realized in the service-type robots.

To improve the reactivity, load ability, and safety, nearly all the manipulators available on the market use the high power motor on the mechanical joint together with the expensive harmonic drive or different forms of safety devices to enhance the performance, so the manufacturing cost of the manipulators are quite expensive, thus limiting the robots from entering the daily life. If the conventional mechanical joint is used in consideration of the costs, the reactivity is low and cannot provide high load at high running speed. Meanwhile, the conventional mechanical joint is influenced by the backlash caused by the clearance between gears, the operation precision of the manipulator is reduced. Further, the reactivity of the manipulator using the conventional mechanical joint is slow, so in consideration of safety, if an additional protection device is provided, the cost of the conventional mechanical joint is increased, and it is not beneficial to the application of the robots in daily life.

SUMMARY OF THE INVENTION

In an embodiment, the present disclosure provides a joint device, which comprises a rotary shaft, two fixing members, two driving members, two transmission gears, and a link gear. The two fixing members are pivoted to each other through the rotary shaft, and two driving members are respectively fixed to the two fixing members. The two transmission gears are respectively connected to the two driving members, and the two driving members respectively drive the two transmission gears to rotate. In addition, the link gear is pivoted to one of the two fixing members, a pivot axis of the link gear and an axis of the rotary shaft are coaxial, and the link gear is engaged with the two transmission gears respectively.

In an embodiment, the present disclosure provides a control method of a joint device, which comprises providing a joint device, in which the two transmission gears and the link gear of the joint device are all bevel gears, and the two transmission gears have the same pitch diameter and number of teeth. Then, pivoting directions of the two transmission gears relative to the rotary shaft are set to be the same, and a relative speed difference of the two transmission gears is set to be zero, so that a relative angular speed of the two fixing members is zero.

In an embodiment, the present disclosure provides a control method of a joint device, which comprises providing a joint device, in which the two transmission gears and the link gear of the joint device are all bevel gears, and the two transmission gears have the same pitch diameter and number of teeth. Then, pivoting directions of the two transmission gears relative to the rotary shaft are set to be the same, and a relative speed difference of the two transmission gears is set to be greater than zero, so that a relative angular speed of the two fixing members is greater than zero.

In an embodiment, the present disclosure provides a control method of a joint device, which comprises providing a joint device, in which the two transmission gears and the link gear of the joint device are all bevel gears, and the two transmission gears have the same pitch diameter and number of teeth. Then, the pivoting directions of the two transmission gears relative to the rotary shaft are set to be the same, and a relative speed difference of the two transmission gears is set to be zero. Next, the encoder detects the two fixing members in a unit time to obtain an angular speed of a fixing member relative to the other fixing member. When the angular speed is not equal to zero, a relative speed difference of the two transmission gears is maintained in a zero state and the speeds of the two transmission gears are reduced.

These and other aspects of the present disclosure will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF THE INVENTION

Figure 1:
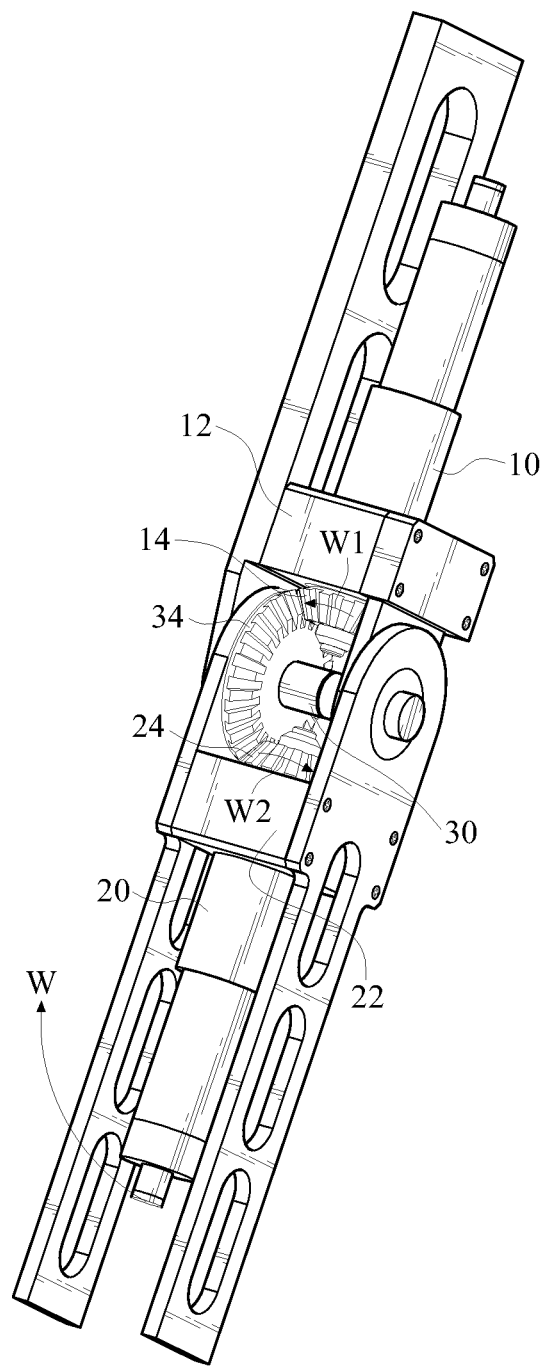
FIG. 1 is a schematic structural view of a joint device according to an embodiment of the present disclosure.
Figure 2A:
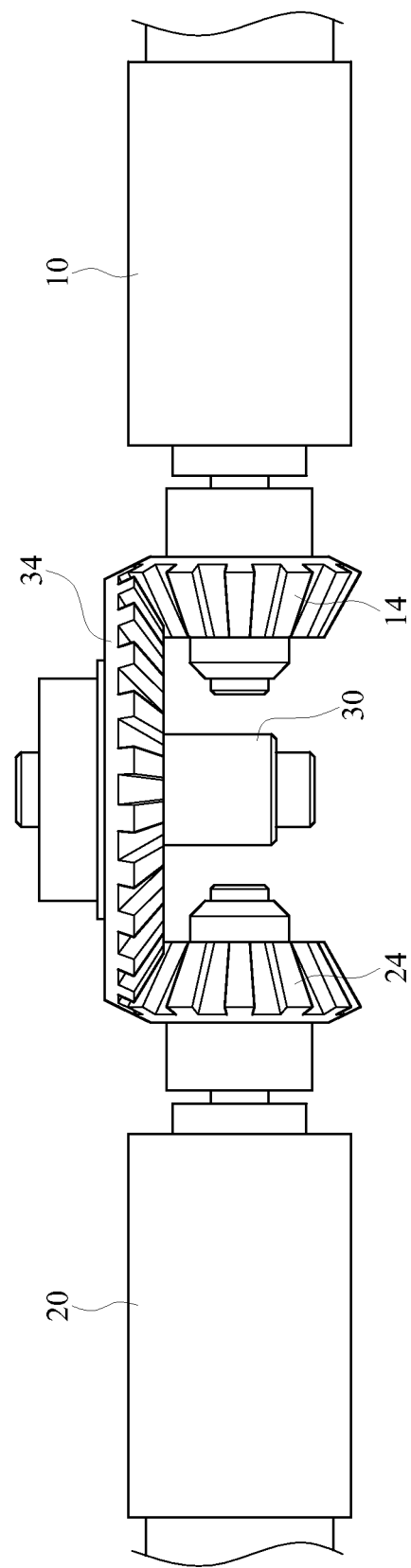
FIG. 2A is a schematic view of linking a first drive motor and a second drive motor of FIG. 1.
Figure 2B:
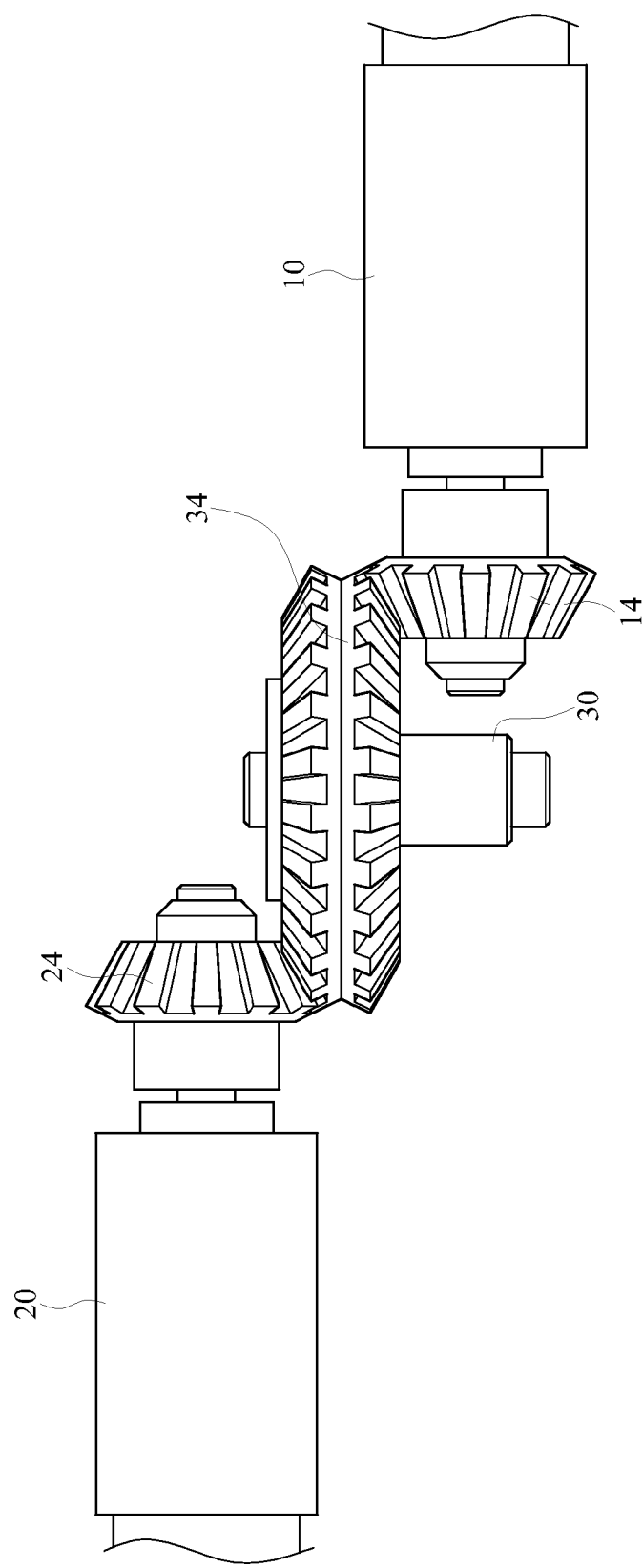
FIG. 2B is a partial enlarged three-dimensional schematic view of linking a first drive motor and a second drive motor according to another embodiment of the present disclosure.
Figure 2C:
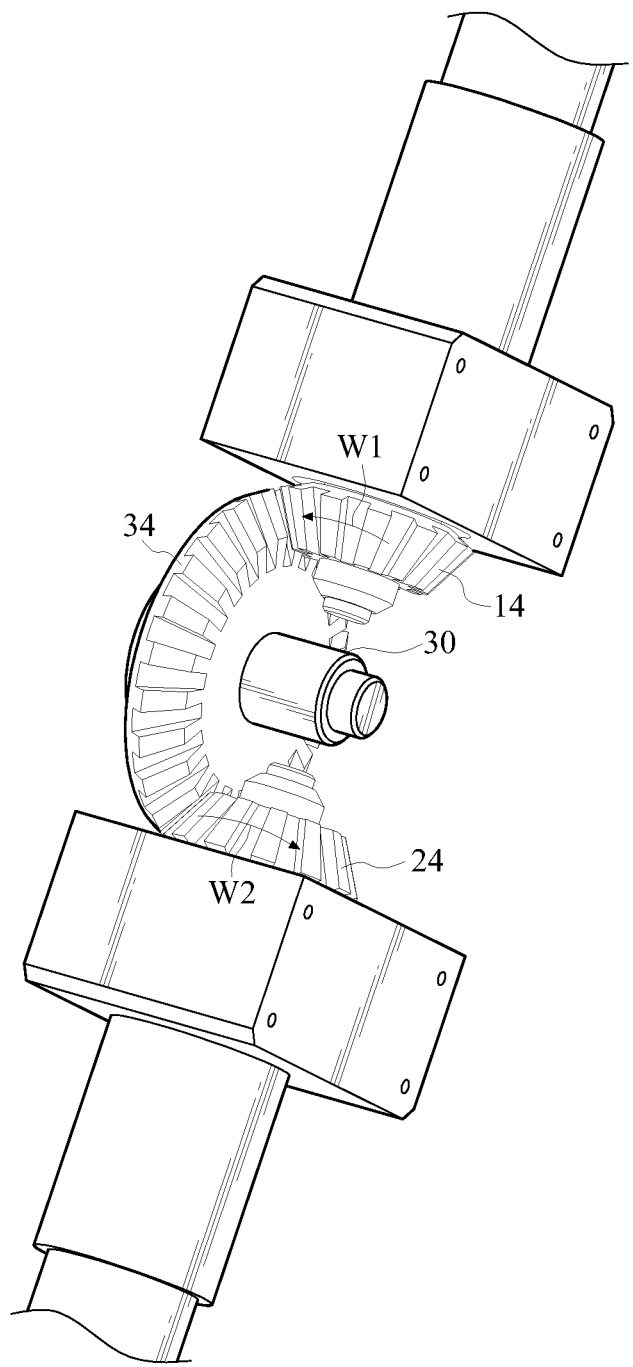
FIG. 2C is a partial enlarged three-dimensional schematic view of linking the first drive motor and the second drive motor of FIG. 1.
Figure 2D:
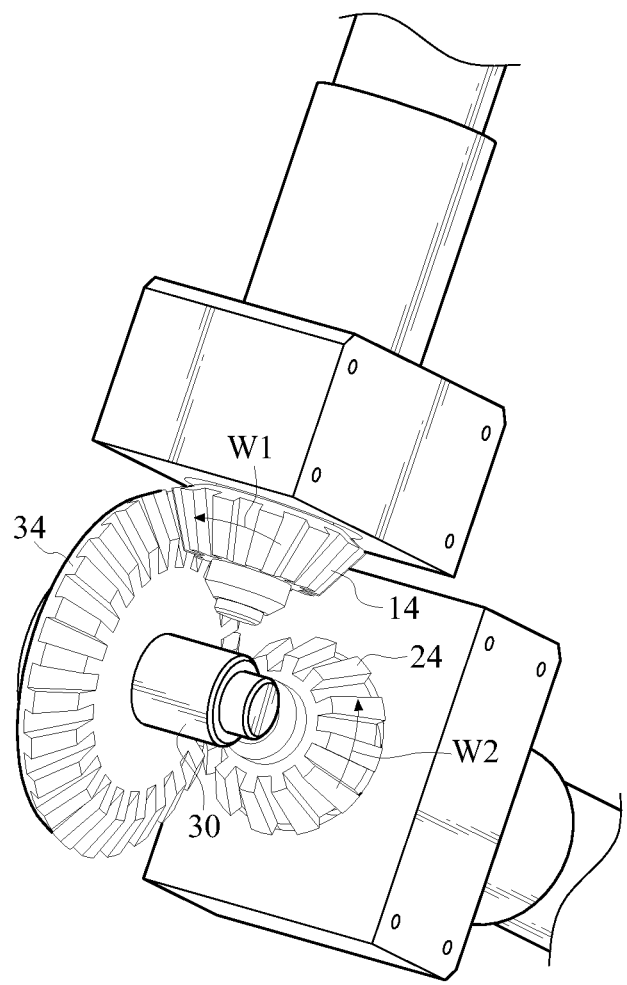
FIG. 2D is a partial enlarged three-dimensional schematic view of linking the first drive motor and the second drive motor of FIG. 1.

Referring to FIGS. 1, 2A, 2B, 2C and 2D, FIG. 1 is a schematic structural view of a joint device according to an embodiment of the present disclosure, FIG. 2A is a schematic view of linking a first drive motor and a second drive motor of FIG. 1, FIG. 2B is a partial enlarged three-dimensional schematic view of linking the first drive motor and the second drive motor according to another embodiment of the present disclosure, and FIGS. 2C and 2D are partial enlarged three-dimensional schematic views of linking the first drive motor and the second drive motor of FIG. 1.

According to an embodiment of the present disclosure, the joint device comprises a rotary shaft 30, a first fixing member 12, a second fixing member 22, a first drive motor 10, a second drive motor 20, a first transmission gear 14, a second transmission gear 24, and a link gear 34. The rotary shaft 30 penetrates the first fixing member 12 and the second fixing member 22. The first fixing member 12 and the second fixing member 22 are pivoted to each other through the rotary shaft 30, that is, the second fixing member 22 may rotate and change an angular displacement relative to the first fixing member 12, and the relative pivot axis of the second fixing member 22 and the first fixing member 12 is coaxial to the rotary shaft 30. The first drive motor 10 is fixed to the first fixing member 12, and the second drive motor 20 is fixed to the second fixing member 22.

The gear centers of the first transmission gear 14 and the second transmission gear 24 are respectively fixed to the shafts of the first drive motor 10 and the second drive motor 20, so that during operation, the first drive motor 10 and the second drive motor 20 may directly drive the first transmission gear 14 and second transmission gear 24 to rotate. In this embodiment, both the first transmission gear 14 and the second transmission gear 24 are bevel gears, and have the same pitch diameter and number of teeth. The first transmission gear 14 and the second transmission gear 24 face the rotary shaft 30. It should be noted that the gear form of the first transmission gear 14 and the second transmission gear 24 is not intended to limit the present disclosure. Furthermore, the first transmission gear 14 and the second transmission gear 24 of this embodiment are connected to the first drive motor 10 and the second drive motor 20 in a directly fixing manner, but the connecting manner of the transmission gears and the drive motors is not intended to limit the present disclosure. For example, according to another embodiment of the present disclosure, the first transmission gear 14 and the second transmission gear 24 may also be connected to the first drive motor 10 and the second drive motor 20 respectively through a gear set, such that the first drive motor 10 and the second drive motor 20 may drive the first transmission gear 14 and the second transmission gear 24 to rotate respectively through the gear set.

The link gear 34 is pivoted to the rotary shaft 30 and engaged with the first transmission gear 14 and the second transmission gear 24 respectively, and the first transmission gear 14 and the second transmission gear 24 are located on the same side of the link gear 34. It should be noted that the pivoting manner, that the rotary shaft 30 penetrates the first fixing member 12, the second fixing member 22 and the link gear 34, is not intended to limit the present disclosure. According to the embodiments of the present disclosure, the pivot axis of the link gear 34 only needs to be coaxial to the rotary shaft 30, and the link gear 34 is not definitely pivoted to the rotary shaft 30. Furthermore, the first transmission gear 14 and the second transmission gear 24 of this embodiment are located on the same side of the link gear 34, which is not intended to limit the present disclosure. For example, the first transmission gear 14 and the second transmission gear 24 may also be located on two opposing sides of the link gear 34 respectively, as shown in FIG. 2B. If the structure of FIG. 2B is adopted, the first fixing member 12 may rotate 360° relative to the second fixing member 22.

Furthermore, in this embodiment, the link gear 34 may further be a bevel gear, and matches the first transmission gear 14 and the second transmission gear 24. The number of teeth of the link gear 34 may be the same as the number of teeth of the first transmission gear 14 and the second transmission gear 24. That is to say, when the first transmission gear 14 or the second transmission gear 24 rotates one cycle, the link gear 34 is driven to rotate one cycle.

It should be noted that the gear type of the first transmission gear 14, the second transmission gear 24, and the link gear 34 is not intended to limit the present disclosure. For the convenience in design, in the present disclosure, the gears are, for example, bevel gears, but may also be ordinary spur gears. In addition, the pitch diameters and numbers of teeth of first transmission gear 14, the second transmission gear 24, and the link gear 34 are not intended to limit the present disclosure either. For the convenience of illustrating the following action principle of the present disclosure, the pitch diameters of the first transmission gear 14 and the second transmission gear 24 are set to be the same, and the numbers of teeth of the first transmission gear 14, the second transmission gear 24, and the link gear 34 are set to be the same. If the numbers of teeth and the pitch diameters of the first transmission gear 14, the second transmission gear 24, and the link gear 34 are not limited to the above relation, as long as proper matching is performed, the present disclosure may still be implemented.

Next, the operation manner of the joint device of this embodiment is illustrated with reference to FIGS. 1, 2A, 2C, and FIG. 2D again. The shaft of the first drive motor 10 may have a first speed W1 to make the first transmission gear 14 fixed thereto rotate relative to the rotary shaft 30 at the first speed W1 and make the first transmission gear 14 rotate in a counterclockwise direction relative to the rotary shaft 30. That is to say, when an observer faces the first transmission gear 14 by taking the rotary shaft 30 as the base point, the observer may observe that the first transmission gear 14 rotates in a counterclockwise direction, and disregarding the relative position between the first fixing member 12 and the second fixing member 22 (in a linear or at an angle), the rotation direction of the first transmission gear 14 observed by the observer by taking the rotary shaft 30 as the base point remains the same, as shown in FIG. 2C or 2D. In addition, the shaft of the second drive motor 20 may have a second speed W2 to make the second transmission gear 24 fixed thereto rotate relative to the rotary shaft 30 at the second speed W2 and make the second transmission gear 24 rotate in a counterclockwise direction relative to the rotary shaft 30. That is to say, when an observer faces the second transmission gear 24 by taking the rotary shaft 30 as the base point, the observer may observe that the second transmission gear 24 rotates in a counterclockwise direction, and disregarding the relative position between the first fixing member 12 and the second fixing member 22 (in a linear or at an angle), the rotation direction of the second transmission gear 24 observed by the observer by taking the rotary shaft 30 as the base point remains the same, as shown in FIG. 2C or 2D.

Figure 2E:
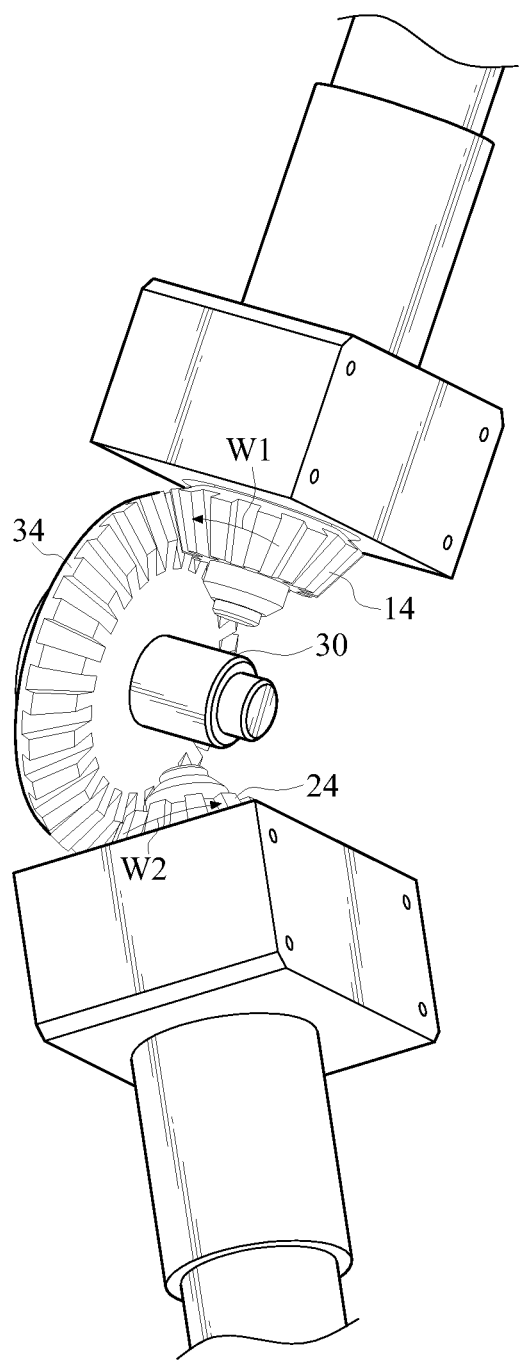
FIG. 2E is a schematic structural view of a second transmission gear and a rotary shaft according to another embodiment of the present disclosure.

Furthermore, the rotation axis of the second transmission gear 24 of this embodiment is perpendicular to the axis of the rotary shaft 30 (as shown in FIG. 2C), but is not intended to limit the present disclosure, and for example, may also be in the form of the following embodiments. FIG. 2E is a schematic structural view of a second transmission gear and a rotary shaft 30 according to another embodiment of the present disclosure. In this embodiment, the rotation axis of the second transmission gear 24 is at an acute angle from the axis of the rotary shaft 30.

It should be noted that the rotation directions of the first transmission gear 14 and the second transmission gear 24 relative to the rotary shaft 30 are not intended to limit the present disclosure, and at least one of the first transmission gear 14 and the second transmission gear 24 may also rotate relative to the rotary shaft 30 in a clockwise direction. Since the numbers of teeth of the first transmission gear 14, the second transmission gear 24, and the link gear 34 are the same, when the first transmission gear 14 drives the link gear 34 to rotate at a first speed W1, the link gear 34 may also have the first speed W1. The second transmission gear 24 rotates on the link gear 34 at a second speed W2, so that the second fixing member 22 is at a joint speed W relative to the first fixing member 12 under a transmission relation of the first transmission gear 14, the second transmission gear 24, and the link gear 34. Since the rotation directions of the first transmission gear 14 and the second transmission gear 24 relative to the rotary shaft 30 are the same (the first transmission gear 14 and the second transmission gear 24 rotate in a counterclockwise direction relative to the rotary shaft 30), the joint speed W and the first speed W1 and the second speed W2 have the following relational expression:

Joint speed $W$=Second speed $W2$−First speed $W1$

Figure 7A:
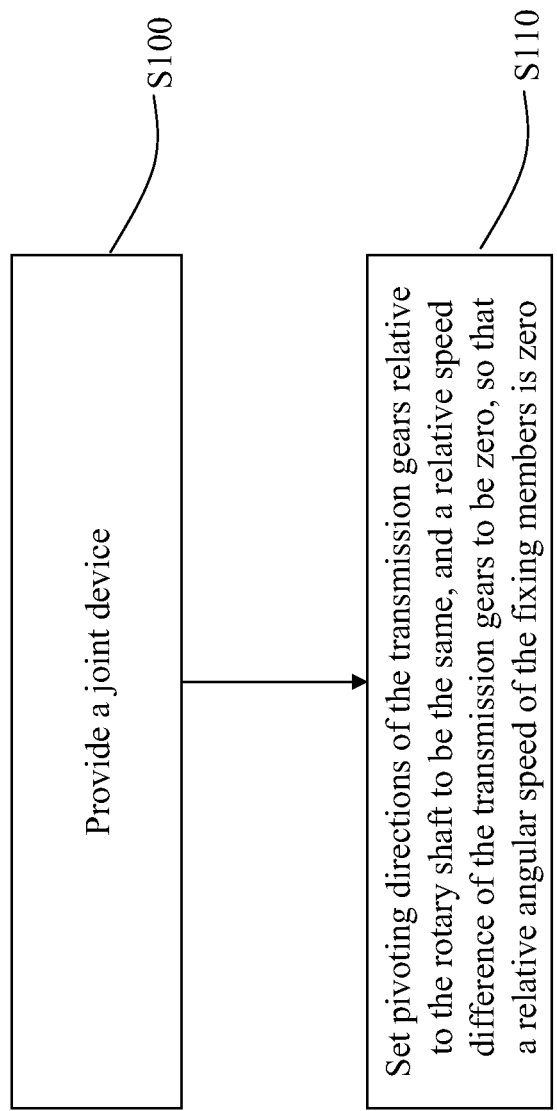
FIG. 7A is a flow chart of a control method of a joint device according to an embodiment of the present disclosure.
Figure 7B:
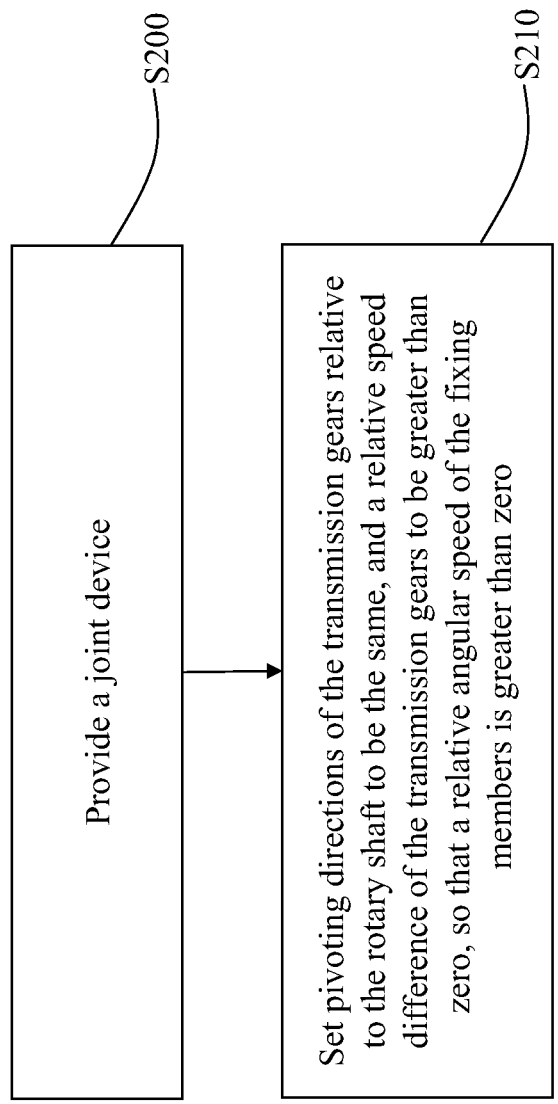
FIG. 7B is a flow chart of a control method of a joint device according to another embodiment of the present disclosure.

At this time, the present disclosure provides a control method of a joint device, and referring to FIG. 7A, a joint device is firstly provided (S100), pivoting directions of a first transmission gear 14 and a second transmission gear 24 relative to a rotary shaft 30 are set to be the same, and a relative speed difference of the first transmission gear 14 and the second transmission gear 24 is set to be equal to zero, so that a relative angular speed of a second fixing member 22 and a first fixing member 12 is equal to zero (S110). The present disclosure further provides a control method of a joint device, and referring to FIG. 7B, a joint device is firstly provided (S200), pivoting directions of a first transmission gear 14 and a second transmission gear 24 relative to a rotary shaft 30 are set to be the same, and a relative speed difference of the first transmission gear 14 and the second transmission gear 24 is set to be greater than zero, so that a relative angular speed of a second fixing member 22 and a first fixing member 12 is greater than zero (S210). The above control method may be obtained from the above relational expression, and when the second speed W2 and the first speed W1 are the same, the joint speed W is zero, that is, the second fixing member 22 and the first fixing member 12 remain stationary relative to each other. When the second speed W2 is greater than the first speed W1, the joint speed W is greater than zero, that is, the second fixing member 22 takes the action of angular displacement relative to the first fixing member 12. Therefore, the changing of difference of the first speed W1 and the second speed W2 may change the joint speed W. If the joint speed W needs reversing, it may be executed only by setting the second speed W2 to be smaller than the first speed W1.

Figure 3A:
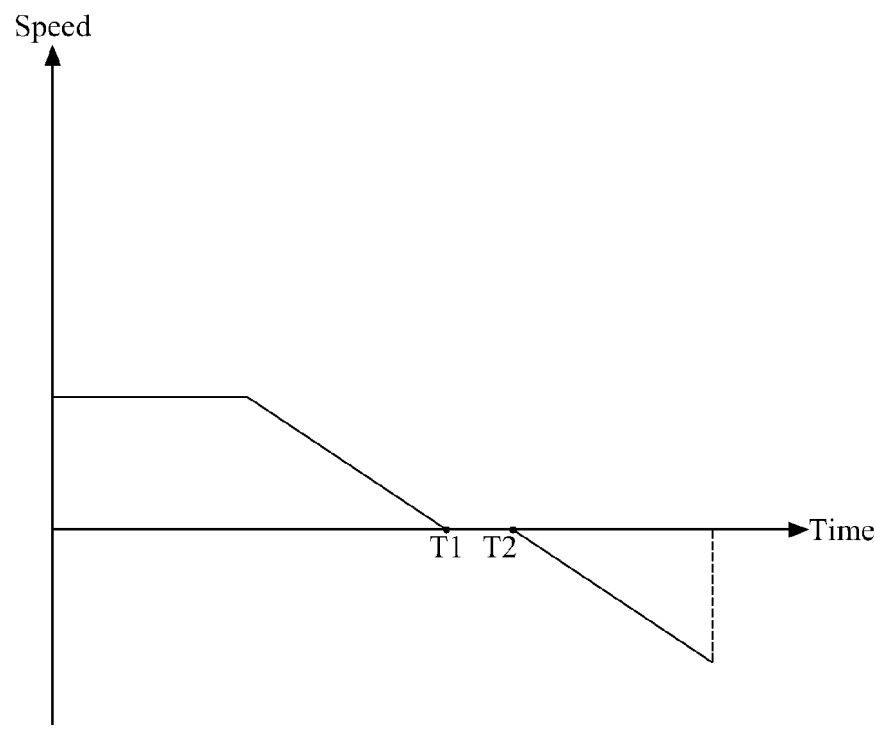
FIG. 3A is a schematic view of a reverse ability of a conventional single drive joint.
Figure 3B:
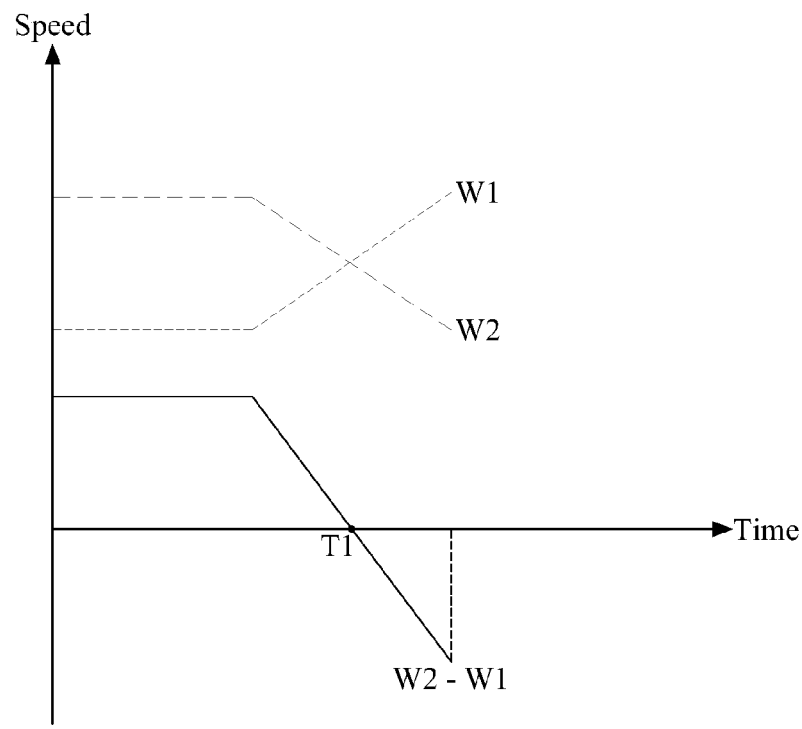
FIG. 3B is a schematic view of a reverse ability of a joint device according to an embodiment of the present disclosure.

Referring to FIGS. 3A and 3B, FIG. 3A is a schematic view of a reverse ability of a conventional single drive joint, and FIG. 3B is a schematic view of a reverse ability of a joint device according to an embodiment of the present disclosure.

The conventional single drive joint has only one motor, so if it is intended to execute reversing in operation, the motor experiences decelerating, stopping till reversing, as shown in FIG. 3A, thus the conventional single drive joint must stop for a period of time (for example, the time period T1 to T2 in FIG. 3A). According to an embodiment of the present disclosure, the joint device has the first drive motor 10 and the second drive motor 20, so when the joint speed W needs reversing, it is only required to decelerate the second speed W2 that is originally greater than the first speed W1 and accelerate the first speed W1. When the first speed W1 is greater than the second speed W2, the reversing of the joint speed W is achieved, so the joint device has the effect of quick moving in a reverse direction, as shown in FIG. 3B. Therefore, the joint device of this embodiment may achieve the effect of the reversing of the joint speed W without experiencing the reversing of the first drive motor 10 and the second drive motor 20, and thus the joint device just stops for a little while when reversing (for example, the time point T1 in FIG. 3B). As compared with the conventional single drive joint that stops for a period of time when reversing, the joint device of this embodiment has the characteristic of high speed reversing, thereby further improving the reactivity of operation. Since when the joint speed W of the joint device of this embodiment is reversed, it is only required to adjust the speed difference of the first speed W1 and the second speed W2. So the first drive motor 10 and second drive motor 20 do not take the reverse action in normal state, thus avoiding the joint device from being influenced by the backlash between gears and further improving the operation precision of the joint device.

In view of the above, the joint device of the present disclosure may achieve different joint speeds W by different combinations of the first speed W1 of the first drive motor 10 and the second speed W2 of the second drive motor 20. Therefore, the joint device of the present disclosure may achieve the effect of continuous speed transmission without using additional transmission devices.

Figure 4A:
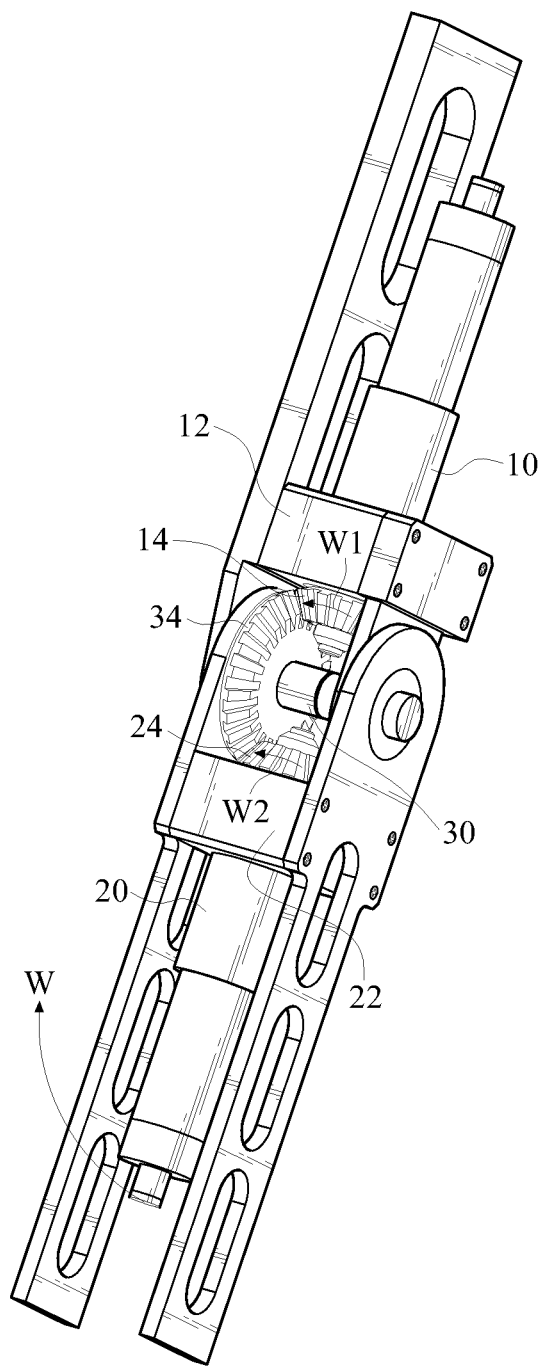
FIG. 4A is a schematic structural view of a joint device according to another embodiment of the present disclosure.

Referring to FIG. 4A, it is a schematic structural view of a joint device according to another embodiment of the present disclosure. The joint device of the present disclosure has a first drive motor 10 and a second drive motor 20. The first drive motor 10 and the second drive motor 20 are respectively fixed to a first fixing member 12 and a second fixing member 22. The first drive motor 10 and the second drive motor 20 are in the transmission relation relative to each other through a first transmission gear 14, a second transmission gear 24, and a link gear 34. In other words, the joint device may be driven by the first drive motor 10 and the second drive motor 20 at the same time.

The shaft of the first drive motor 10 has a first speed W1, so that the first transmission gear 14 fixed thereto rotates relative to a rotary shaft 30 at the first speed W1, and the first transmission gear 14 may rotate relative to the rotary shaft 30 in a counterclockwise direction. In addition, the shaft of the second drive motor 20 has a second speed W2, so that the second transmission gear 24 fixed thereto rotates relative to the rotary shaft 30 at the second speed W2, and the second transmission gear 24 may rotate relative to the rotary shaft 30 in a clockwise direction. Since the numbers of teeth of the first transmission gear 14, the second transmission gear 24, and the link gear 34 are the same, when the first transmission gear 14 drives the link gear 34 to rotate at the first speed W1, the link gear 34 may have the first speed W1. The second transmission gear 24 rotates on the link gear 34 at the second speed W2, so that the second fixing member 22 has a joint speed W relative to the first fixing member 12 under the transmission relation of the first transmission gear 14, the second transmission gear 24, and the link gear 34. Since the rotation directions of the first transmission gear 14 and the second transmission gear 24 relative to the rotary shaft 30 are opposite, the joint speed W and the first speed W1 and the second speed W2 have the following relational expression:

Joint Speed $W$=Second speed $W2$+First speed $W1$

Therefore, as compared with the conventional single drive joint that uses a single motor to provide the power source for operation, the joint device of this embodiment has the characteristics of high speed and high rigidity, and the manner of achieving the above characteristics is illustrated by the following examples.

Figure 4B:
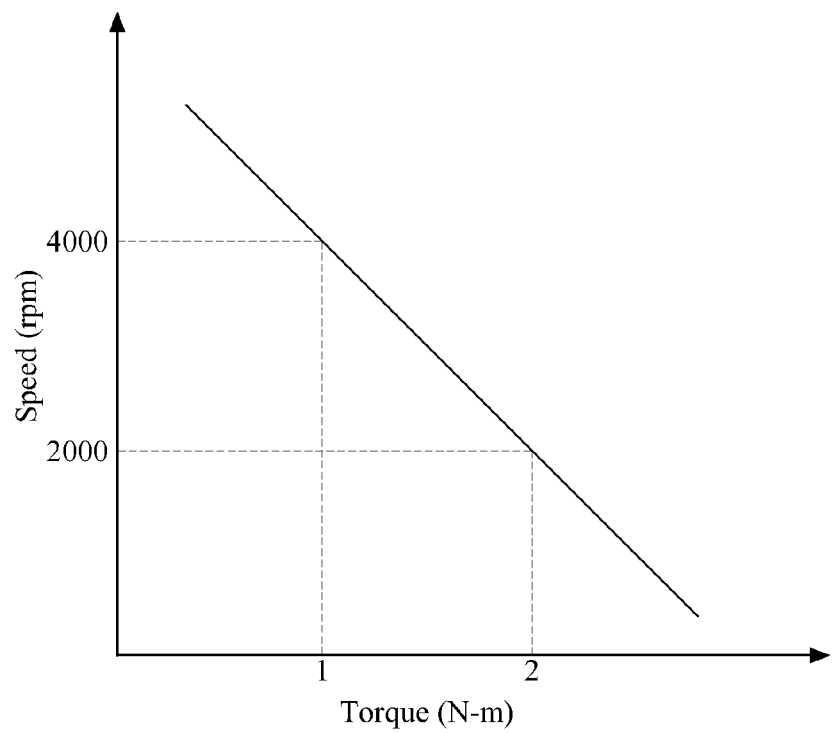
FIG. 4B illustrates a relation of torque and speed of the conventional single drive joint.
Figure 4C:
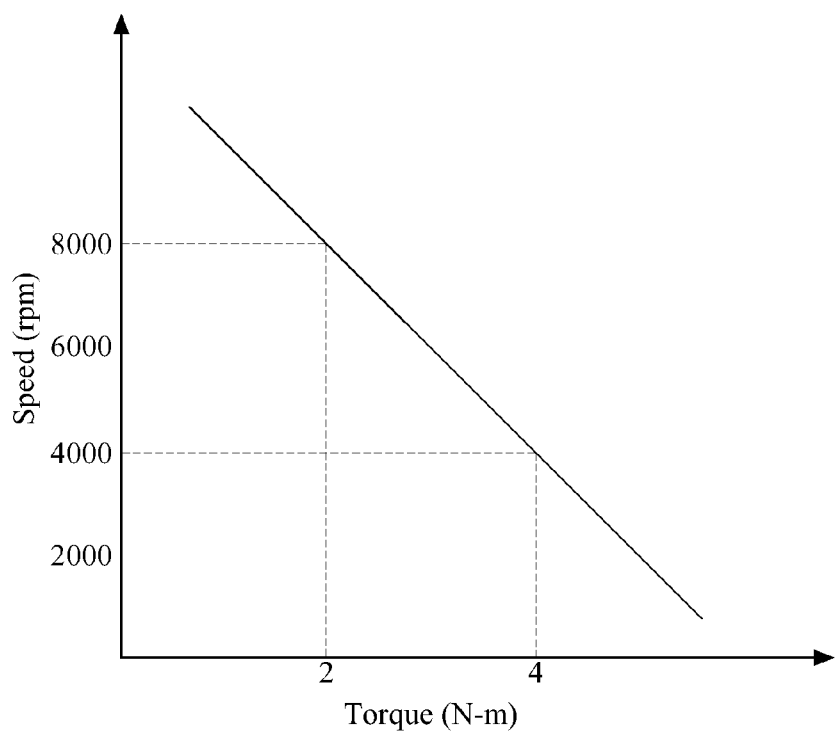
FIG. 4C illustrates a relation of torque and speed of a joint device according to an embodiment of the present disclosure.

Referring to FIGS. 4B and 4C, FIG. 4B illustrates a relation of torque and speed of the conventional single drive joint, and FIG. 4C illustrates a relation of torque and speed of the joint device according to an embodiment of the present disclosure.

In theory, the product of the torque and speed of the same motor is a constant value. If the joint device of this embodiment and the conventional single drive joint use the same motor, and the product of the torque and speed of the motor is 4000 rpm-N-m, the throughput of the conventional single drive joint has the relation as shown in FIG. 4B. That is to say, when the torque is 1 N-m, the speed is 4000 rpm, and when the torque is 2 N-m, the speed is 2000 rpm, as shown in FIG. 4B. The throughput of the joint device of this embodiment has the relation as shown in FIG. 4C. Since the joint device of this embodiment has two motors, the speed and torque doubles, that is, when the single motor torque is 1 N-m and the speed is 4000 rpm, the sum of the throughputs of two motors is torque 2 N-m and the speed is 8000 rpm, as shown in FIG. 4C. When the torque of single motor is 2 N-m and the speed is 2000 rpm, the sum of the throughputs of two motors is torque 4N-m and the speed is 4000 rpm, as shown in FIG. 4C. After comparing FIGS. 4B and 4C, when the speeds of the conventional single drive joint and the joint device of this embodiment are both 4000 rpm, the torques are respectively 1 N-m and 4 N-m. That is to say, under the same speed throughput, the torque of the joint device of this embodiment is four times of the single drive joint, so a large rigidity is obtained to realize the requirement of high load output. When the torques of the conventional single drive joint and the joint device of this embodiment are both 2 N-m, the speeds are respectively 2000 rpm and 8000 rpm. That is to say, under the same throughput of torque, the speed of the joint device of this embodiment is four times of the conventional single drive joint, so as to achieve the requirement of high response throughput.

Referring back to FIG. 1 together with FIGS. 3A and 4C, it should be noted that when the joint speed W satisfies the following relational expression:

Joint speed $W$=Second speed $W2$−First speed $W1$ and the second speed W2 and the first speed W1 are the same, the joint speed W is zero, that is, the second fixing member 22 and the first fixing member 12 remain stationary relative to each other. At this time, by reducing the second speed W2 and the first speed W1 at the same time, the torques of the first drive motor 10 and the second drive motor 20 are relatively improved, and the joint speed W is still zero. In the situation that the second fixing member 22 and the first fixing member 12 remain stationary relative to each other, by using the above manner, the rigidity of the joint device of this embodiment is improved to increase the load ability.

Figure 5:
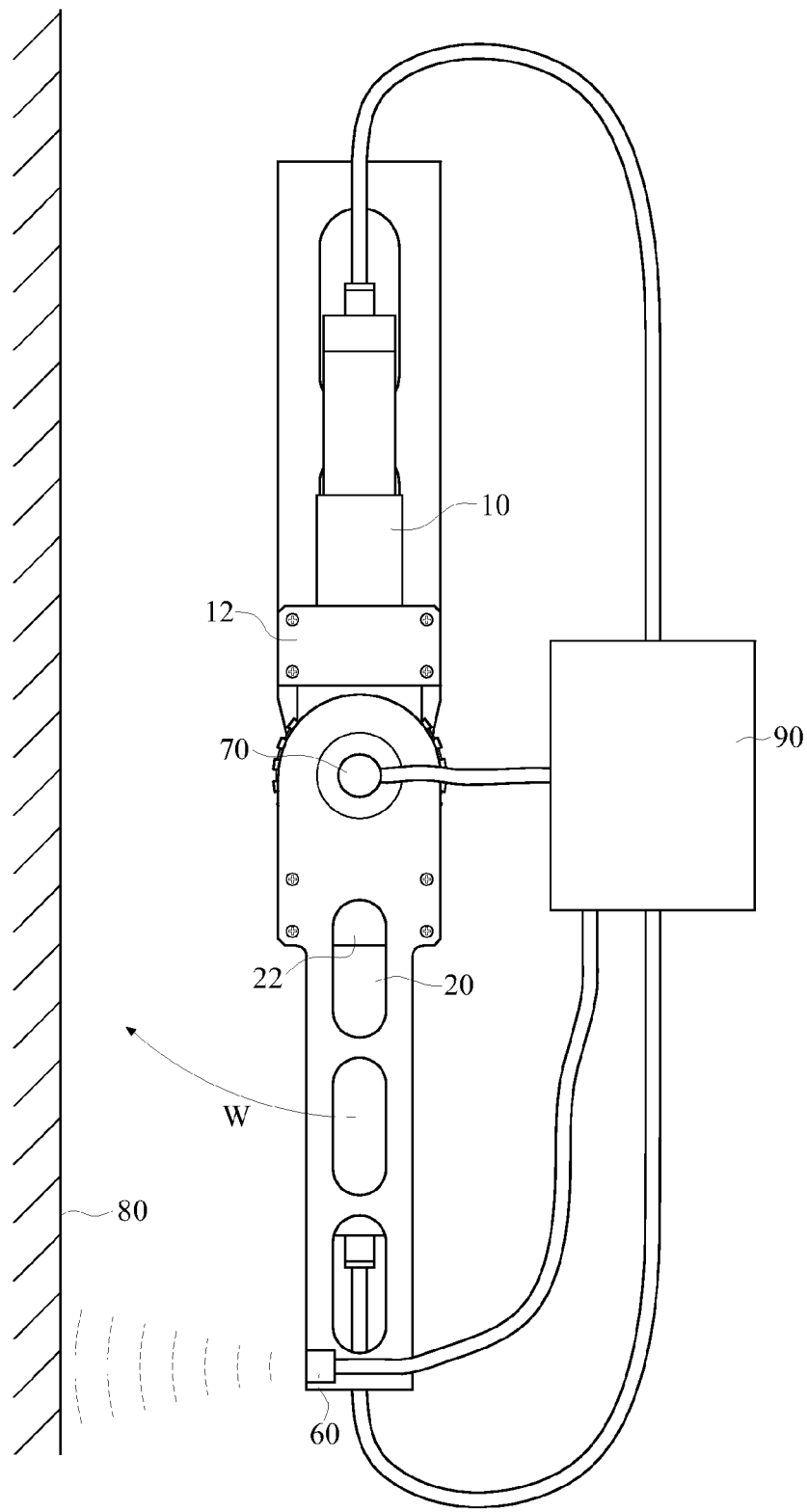
FIG. 5 is a schematic structural view of a joint device according to still another embodiment of the present disclosure.

Referring to FIG. 5, it is a schematic structural view of a joint device according to still another embodiment of the present disclosure. This embodiment differs from the embodiment of FIG. 1 in terms of adding peripheral members, so only the difference is illustrated.

The joint device of this embodiment further comprises a control unit 90, a distance sensor member 60, and an encoder 70. The encoder 70 is disposed on a tail end of the rotary shaft 30, and is in signal connection to the control unit 90. The encoder 70 measures a relative angular displacement of the first fixing member 12 and the second fixing member 22 and transmits data of the angular displacement to the control unit 90. The control unit 90 is electrically connected to the first drive motor 10 and the second drive motor 20 respectively, and according to the data provided by the encoder 70, the control unit 90 controls the first speed W1 and the second speed W2 to execute the joint speed W, i.e. to drive the angular displacement and speed of the second fixing member 22 relative to the first fixing member 12.

The distance sensor member 60 is disposed on the second fixing member 22 and is in signal connection to the control unit 90. The distance sensor member 60 senses a distance of the first fixing member 12 or the second fixing member 22 relative to an ambient object 80, and transmits the data to the control unit 90 to adjust the first speed W1 and the second speed W2 and avoid the collision of the first fixing member 12 or the second fixing member 22 with the ambient object 80, thus serving as a safety protection measure of the joint device of this embodiment.

In addition, in view of the above embodiments, when pivoting directions of the first transmission gear 14 and the second transmission gear 24 relative to the rotary shaft 30 are the same, and the relative speed difference of the first transmission gear 14 and the second transmission gear 24 is zero, the first fixing member 12 and the second fixing member 22 remain stationary relative to each other. The user may improve the rigidity of the joint device by reducing the speeds of the first drive motor 10 and the second drive motor 20, so as to increase the load ability. Therefore, when the above joint device is applied in a manipulator and the manipulator is supporting an object, if the manipulator intends to hold the object in a stationary state, the joint device may carry out the following action manner. If the weight of the object is too heavy and exceeds the rigidity load of the manipulator, the manipulator is forced to be bent under the weight of the object, and thus the first fixing member 12 produces a relative angular displacement relative to the second fixing member 22 from the first position and moves to a second position. At this time, in this embodiment, in the course of the first fixing member 12 moving from the first position to the second position, the speeds of the first transmission gear 14 and the second transmission gear 24 are reduced at the same time to increase the rigidity load of the manipulator, so that the rigidity of the manipulator overcomes the weight of the supported object to maintain the first fixing member at the second position and support the object. Hereinafter, the method is illustrated in more details.

Figure 7C:
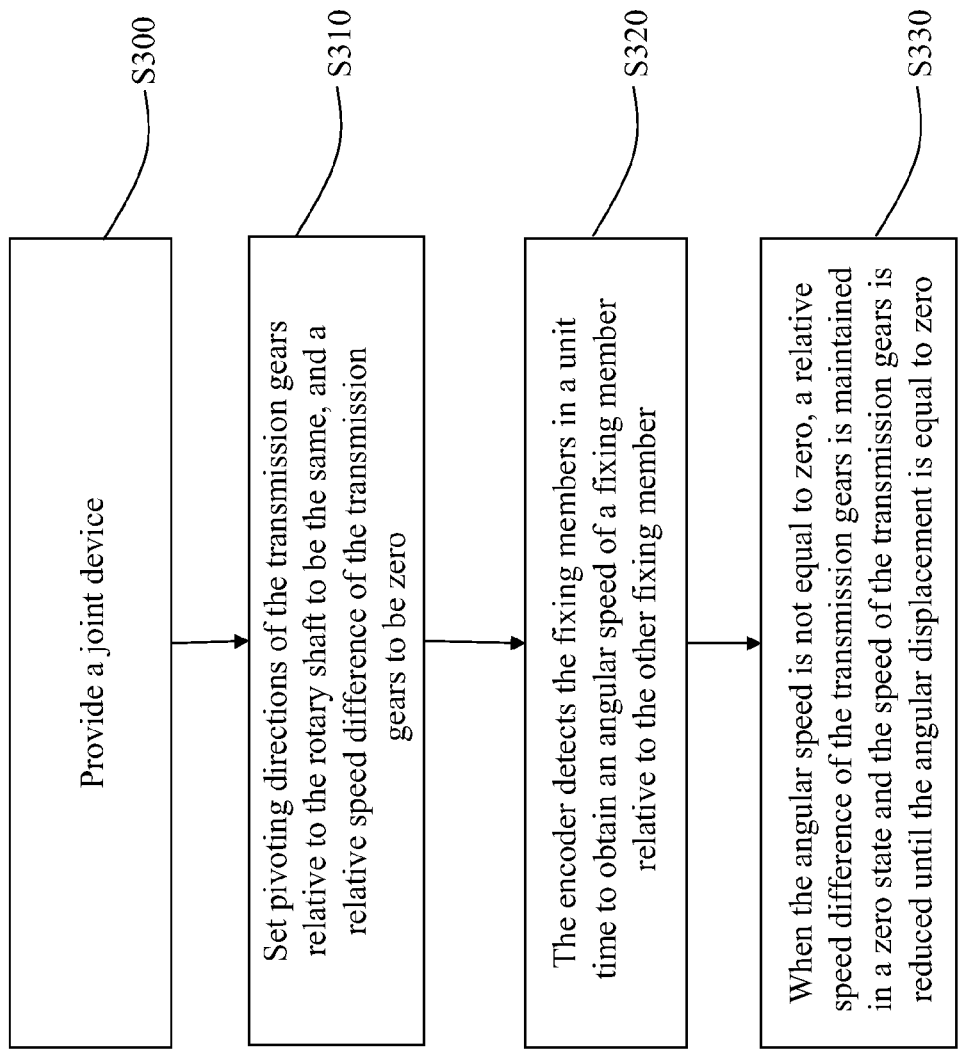
FIG. 7C is a flow chart of a control method of a joint device according to an embodiment of the present disclosure.

The present disclosure further provides a control method of a joint device, referring to FIG. 7C, it is a flow chart of a control method of a joint device according to an embodiment of the present disclosure. First, a joint device of this embodiment is provided (S300). The pivoting directions of a first transmission gear 14 and a second transmission gear 24 relative to a rotary shaft 30 are set to be the same, and a relative speed difference of the first transmission gear 14 and the second transmission gear 24 is set to be zero (S310). Then, an encoder 70 detects an angular speed of a second fixing member relative to a first fixing member 12 in a unit time (S320), when the angular speed is not equal to zero and the relative speed difference of the first transmission gear 14 and the second transmission gear 24 is maintained to be zero, the speeds of the first transmission gear 14 and the second transmission gear 24 are reduced at the same time until the angular displacement is equal to zero (S330).

Figure 6:
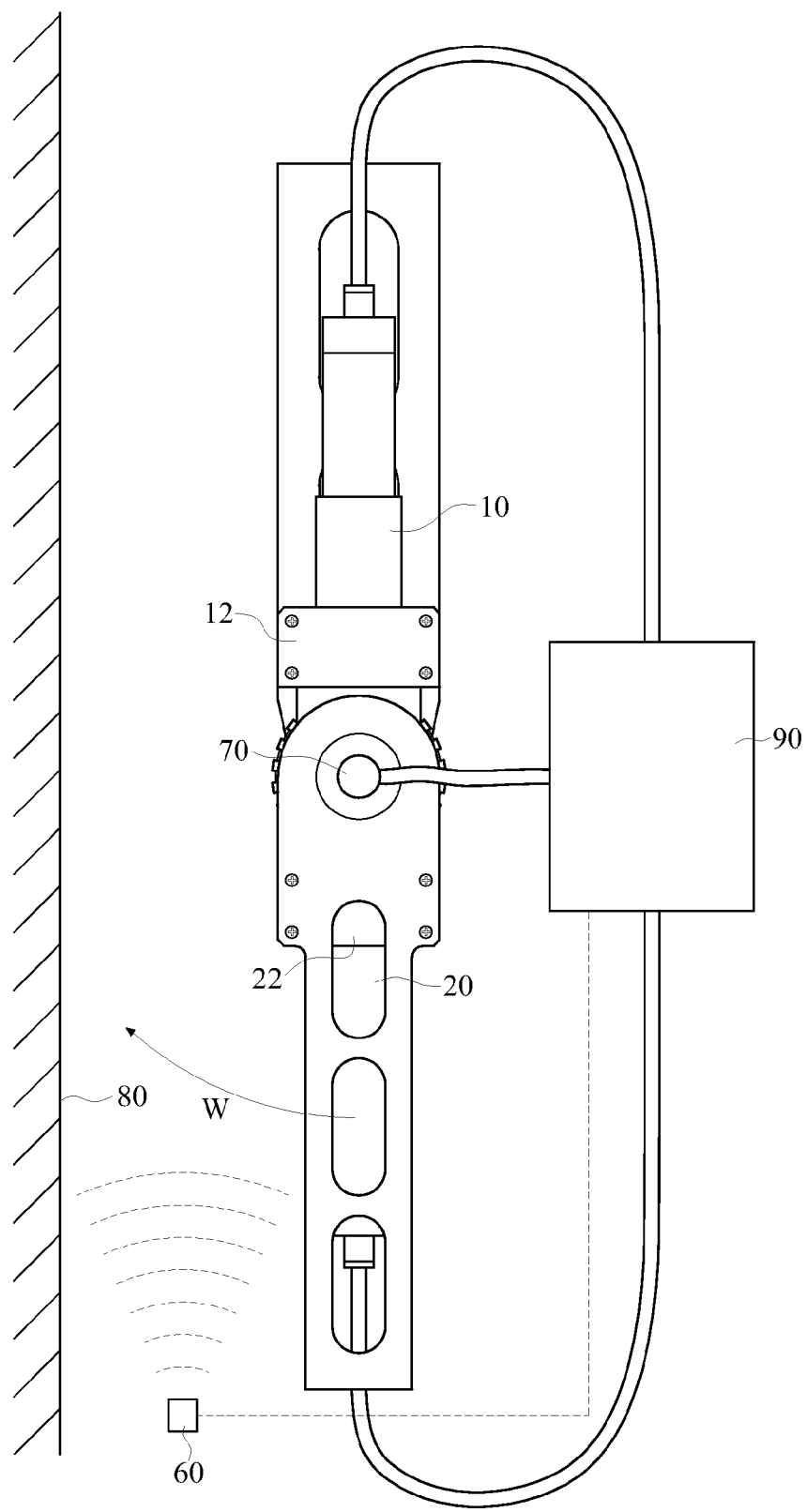
FIG. 6 is a schematic structural view of a joint device according to yet another embodiment of the present disclosure.

Referring to FIG. 6, it is a schematic structural view of a joint device according to yet another embodiment of the present disclosure. Since the structures of this embodiment and the embodiment of FIG. 5 are substantially the same, so only the difference is illustrated herein. A distance sensor member 60 is disposed in a surrounding environment and is in signal connection to a control unit 90. The distance sensor member 60 senses a distance of a first fixing member 12 or a second fixing member 22 relative to an ambient object 80 and transmits data to the control unit 90 to adjust a first speed W1 and a second speed W2 and avoid the collision of the first fixing member 12 or the second fixing member 22 with the ambient object 80, thus providing the safety protection measure of the high response joint of this embodiment.

Since the conventional joint device does not have the high response characteristic, in the safety protection measure, in addition to the distance sensor member 60, an energy absorption device needs to be added to stop the joint device running at high speed. The joint device of this embodiment has the characteristic of high speed reversing, so only the distance sensor member 60 is disposed to achieve the requirement of safety protection measure. Therefore, the manipulator employing the joint device of this embodiment has a lower cost as compared with the conventional manipulator, so it is beneficial to the popularization of the manipulator in daily life.

According to the joint device of the above embodiment, due to the arrangement of the dual motors, the joint device is provided with high speed and high rigidity. As compared with the conventional joint device using the single motor, when the joint device of this embodiment and the conventional joint device are at the same speed, the torque of the joint device of this embodiment is four times of that of the joint device, and if the joint device of this embodiment and the conventional joint device have the same torque, the speed of the joint device of this embodiment is four times of that of the joint device.

In addition, the joint device of this embodiment may control the different combinations of speeds of the dual motors and the speed difference of the dual motors to achieve the continuous speed transmission of the joint and the high speed reversing function, so as compared with the conventional joint device, the joint device of this embodiment has a better reactivity. The dual motors of this embodiment in speed transmission do not need reversing, so the influence of the backlash on the operation precision of the joint device is eliminated.

Furthermore, the joint device of this embodiment has a high response characteristic, so in consideration of the safety protection measure, only the distance sensor member needs to be added. As compared with the conventional joint device which needs the expensive harmonic drive, the joint device of this embodiment has a lower cost, so the price is plain, and the joint device is beneficial to the popularization of the service robots into daily life.

What is claimed is:

1. A control method for a joint device, comprising:
   providing the joint device, wherein the join device comprises:
   a rotary shaft;
   two fixing members, pivoted to each other through the rotary shaft;
   two driving members, respectively fixed to the fixing members;
   two transmission gears, respectively connected to the driving members respectively driving the transmission gears to rotate; and
   a link gear, pivoted to one of the fixing members, wherein a pivot axis of the link gear and the rotary shaft are coaxial, the link gear is engaged with the transmission gears respectively, and a relative position between the pivot axis and any one of the fixing members remains constant;
   wherein the transmission gears and the link gear are all bevel gears, and the transmission gears have the same pitch diameter and number of teeth;
   setting pivoting directions of the transmission gears relative to the rotary shaft to be the same, and setting a relative speed difference of the transmission gears to be greater than zero, so that a relative angular speed of the fixing members is greater than zero to rotate the joint device in a direction; and
   changing the relative speed difference of the transmission gears to be smaller than zero, so that the relative angular speed of the fixing members is smaller than zero to rotate the joint device in a reverse direction without changing the pivoting directions of the transmission gears.

2. The control method according to claim 1, wherein the link gear is pivoted to the rotary shaft and engaged with the transmission gears respectively.

3. The control method according to claim 1, wherein the joint device further comprises at least one gear set, connected to one of the transmission gears and the driving member corresponding to the transmission gear.

4. The control method according to claim 1, wherein the transmission gears are located on the same side of the link gear.

5. The control method according to claim 1, wherein the transmission gears are respectively located on two opposing sides of the link gear.

6. The control method according to claim 1, wherein the joint device further comprises:
   a control unit, connected to the driving members, for controlling speeds of the driving members; and
   a distance sensor member, connected to the control unit, for detecting a distance between the fixing members and an ambient object and transmitting a detection value corresponding to the distance to the control unit, so that the control unit controls the speeds of the driving members based on the detection value.

7. The control method according to claim 6, wherein the distance sensor member is disposed on the fixing members, and detects the distance between the fixing members and the ambient object.

8. The control method according to claim 6, wherein the distance sensor member is disposed in a surrounding environment of the joint device, and detects the distance between the fixing members and the ambient object.

9. The control method according to claim 6, wherein the joint device further comprises an encoder, disposed on a pivoting position of the fixing members and connected to the control unit, for measuring a relative angle displacement between the fixing members and transmitting information of the angle displacement to the control unit.

\* \* \* \* \*